(12) United States Patent
Brown et al.

(10) Patent No.: US 7,389,298 B2
(45) Date of Patent: Jun. 17, 2008

(54) SEAMLESS REMOTE TRAVERSAL OF MULTIPLE NFSV4 EXPORTED FILE SYSTEMS

(75) Inventors: William Boyd Brown, Austin, TX (US); Rodney Carlton Burnett, Austin, TX (US); Duen-wen Hsiao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 10/992,429

(22) Filed: Nov. 18, 2004

(65) Prior Publication Data

US 2006/0106827 A1    May 18, 2006

(51) Int. Cl.
    *G06F 7/00* (2006.01)
(52) U.S. Cl. ............... 707/100; 707/1; 707/102; 707/200; 709/218
(58) Field of Classification Search ........... 707/100, 707/102, 3, 1, 200; 709/218
    See application file for complete search history.

(56) References Cited

U.S. PATENT DOCUMENTS

| 5,001,628 | A | 3/1991 | Johnson et al. ............ 264/200 |
| 5,758,334 | A | 5/1998 | Knight, III et al. ............ 707/2 |
| 5,893,086 | A | 4/1999 | Schmuck et al. ............ 707/1 |
| 6,487,547 | B1* | 11/2002 | Ellison et al. ................. 707/2 |
| 6,714,953 | B2 | 3/2004 | Grubbs et al. ............ 707/205 |
| 6,766,314 | B2 | 7/2004 | Burnett .......................... 707/2 |
| 6,779,130 | B2 | 8/2004 | Sprunt et al. .................. 714/6 |
| 7,181,439 | B1* | 2/2007 | Lent et al. ...................... 707/2 |
| 7,272,613 | B2* | 9/2007 | Sim et al. .................... 707/102 |
| 2002/0133491 | A1* | 9/2002 | Sim et al. ..................... 707/10 |
| 2003/0009449 | A1* | 1/2003 | Grubbs et al. ................. 707/3 |
| 2003/0177107 | A1 | 9/2003 | Brown et al. .................. 707/1 |
| 2003/0187822 | A1 | 10/2003 | Lefurgy et al. ................. 707/1 |
| 2004/0078467 | A1* | 4/2004 | Grosner et al. ............ 709/226 |
| 2004/0267752 | A1* | 12/2004 | Wong et al. .................... 707/9 |
| 2004/0267832 | A1* | 12/2004 | Wong et al. ................ 707/200 |
| 2005/0273455 | A1* | 12/2005 | Betros et al. ................... 707/1 |
| 2006/0101025 | A1* | 5/2006 | Tichy et al. ................ 707/100 |
| 2007/0174428 | A1* | 7/2007 | Lev Ran et al. ............ 709/218 |

OTHER PUBLICATIONS

IBM Research Disclosure n342, Nov. 1992, Duvall et al., Technique to Handle Mounted File Systems within File Systems, abstract.

(Continued)

*Primary Examiner*—Apu Mofiz
*Assistant Examiner*—Thu Nga Nguyen
(74) *Attorney, Agent, or Firm*—Duke W. Yee; Marilyn S. Dawkins; Mari A. Stewart

(57) ABSTRACT

A method for transparently navigating through exported file system namespaces on a server using a single mount. When an exported file system is mounted onto a client, the client creates a file system ID structure for the exported file system, wherein the file system ID structure is populated with unique properties of the exported file system, and wherein the unique properties include a file system ID. The client also creates an internal virtual file system structure for the exported file system ID structure, wherein the internal virtual file system structure includes a virtual file system ID. Once the file system and virtual file system structures are created, the client links the file system objects created within the mount to the file system ID structure until a user moves from one exported file system to a second exported file system and a new file system ID is detected.

1 Claim, 3 Drawing Sheets

OTHER PUBLICATIONS

IBM Technical Disclosure Bulletin v39, n5, May 1996, p. 25-26, Burnett et al., "Adding Transparent NFS/Distributed File Services Gateway Authentication for PC-NFS Clients", abstract.

IBM Technical Disclosure Bulletin n10b, Mar. 1992, p. 408-409, Carpenter, "Single System Image with Network File System", abstract.

IBM Technical Disclosure Bulletin n4a, Sep. 1991, p. 363-366, Rasumssen et al., "Bootable Installable File System and Remote Initial Program Load Method", abstract.

IBM Technical Disclosure Bulletin n12, May 1992, p. 370-371, Gittins et al., "OS/2 Logical File System", abstract.

IBM Technical Disclosure Bulletin v38, n12, Dec. 1995, p. 181-182, Curran et al., "Two-Phase Unmount for Globally Mounted File Systems in a Cluster Environment", abstract.

IBM Research Disclosure n449, Sep. 2001, Article 167, p. 1615, McBrearty, "Method for Extended NFS File System Attributes to a Volume Manager", abstract.

IBM Research Disclosure n452, Dec. 2001, Article 135, p. 2125, Inagaki, "File Server Works Without Administration", abstract.

IBM Research Disclosure 455133, "Method to Store File System Mount Options and Device Information in an Extended Attribute that is Part of the Directory Being Mounted Over", Mar. 2002, p. 495.

IBM Technical Disclosure Bulletin, v39, n5, May 1996, p. 119-120, "Encoding/Decoding Scheme to Provide CD-ROM Filesystem Support to Distributed Computing Environment Distributed File Services", abstract.

IBM Research Disclosure n441, Jan. 2001, Article 165, p. 170, Burnett, "A Method for Faster Searches of External File Properties Using Negative Caching of Directory Relationships", abstract.

* cited by examiner

SEAMLESS REMOTE TRAVERSAL OF MULTIPLE NFSV4 EXPORTED FILE SYSTEMS

BACKGROUND OF THE INVENTION

1. Technical Field

The present invention relates generally to an improved data processing system. In particular, the present invention provides a method, system, and computer program instructions for allowing a user to transparently navigate through multiple Network File System version 4 exported file system boundaries using a single client side network mount.

2. Description of Related Art

A network file system (NFS) is a client-server application that allows network users to manage files on several computers inside a network as if they were on the local hard disk. Some computer systems, especially those running a Microsoft operating system such as Windows, generally attach all branches (file systems or directories) of a directory tree upon startup. However, UNIX-based computer systems typically do not do so. UNIX-based systems usually only attach certain branches to the directory tree on startup. These attached branches contain files that are critical for the operating system to function properly. The other file systems are mounted only when needed. Thus in the current UNIX world, when a user on one machine attempts to access information within a file system on a different machine, the user must perform some kind of network mount to establish a connection between the two machines. Many networked installations currently perform mounts by using a network file system (NFS) protocol, such as Network File System version 4 (NFSv4). NFS is a distributed file system protocol that provides remote access to shared files systems across networks. With NFS, computer systems connected to a network operate as clients when accessing remote files and as servers when providing remote users access to local shared files.

When a user on machine A wants access to files on machine B, the user mounts the file system from a server machine, and thus integrates the file system into the machine A's directory tree. The user also specifies where in the directory tree the files should appear. The directory given is called the mount point. A mount point is an empty directory or subdirectory that is created as a place to attach a remote file system. If the user on machine A wants to access information in another file system on machine B, the user must perform another network mount to establish another connection between the two machines in order to do so.

For example, a user on client machine A wants to gain access to three different file systems on server machine B. These file systems may be named "/usr", "/usr/local", and "/usr/local/bin". In response to the request from the user on machine A, the system administrator on server machine B exports those three file systems, "/usr", "/usr/local", and "/usr/local/bin", allowing access for client machine A. By exporting the file systems, the file systems become available for the system administrator to mount on machine A. In response, system administrator on machine A establishes a connection using an NFS mount for exported file system "/usr". Once the exported file system "/usr" is mounted, data within the "/usr" file system is now available to the user on machine A. However, in order for the user to also have access to the "/usr/local" and "/usr/local/bin" file systems, the system administrator must also perform two additional mounts to establish a connection via NFS for exported file system "/usr/local", and to establish a connection via NFS for exported file system "/usr/local/bin".

For security purposes, in some implementations of UNIX, such as Advanced Interactive eXecutive (AIX), only users who belong to an administration group on the system can perform mounts and establish the connection between machines. Consequently, it is problematic for other users who do not belong to that special group because they do not have the sufficient rights to perform the mounts.

Current server side mechanisms exist that allow for traversing exported file systems without performing network mounts for each file system. For example, in NFS version 4, a pseudo file system is introduced which provides a link between all of the exported file systems on the server. A pseudo file system is used to connect exported file systems. With a pseudo file system, the server must fill in gaps for directory components between different exported file systems, and allow client requests to cross exported file system boundaries. Additionally, the server must return pseudo (fake) directory information to clients that have not been given export access to involved data. The pseudo file system model results in the server exporting a single file namespace that is in reality a collection of connected individual file systems. Each of the file systems is represented as a unique fsid attribute value in the NFSv4 protocol.

An fsid is an NFSv4 protocol concept that describes a collection of filesystem objects (files, directories, etc.), which have a common set of properties about them. Properties such as the maximum supported filename length and the ability to support setting access control lists (ACLs) are examples of fsid wide properties. In most UNIX NFS server implementations, it is common that the assigned fsid value will equate to an instance of a filesystem that is exported by the NFS server to NFS clients. However, this does not have to be the case. The server may have other methods to group together collections of data that it represents as an fsid.

Thus, from the client, there is a single exported file system space presented by the NFSv4 server. For example, the server exports two directories—"/usr" and "/usr/local/bin". In NFSv4, if "/usr/local" is not exported, the server must provide "/usr/local" as a pseudo file system node to allow clients to traverse from "/usr" to "/usr/local/bin" without receiving a "no such file" error for "/usr/local". With this server model, clients may exploit the above capability provided by the protocol to create an NFS mounted file system that allows a user to traverse between exported file systems (fsids) with only a single mount at the root of the server's exported file space.

Historically, NFS client platform developers have implemented client side auto file system (autofs) mount solutions that allow users to access different exported file systems on the server without the requirement to manually perform the actual network mounts. However, none of these existing implementations provide transparent mounts to the user and they require additional administration independent of the actual NFS file servers to define the mounting rules. Administrators must ensure the consistency of the rules and the actual exported data that resides on server systems. These peripheral solutions have been problematic to deploy due to lack of standardization, availability on the different client platforms, and inconsistent quality. Ultimately, the administrative overhead of autofs is high. Thus, existing solutions are not highly transparent to client users, they require greater administrative overhead, and they have proved difficult to deploy and manage.

The NFSv4 protocol and its server pseudo file system export model create an opportunity for new methods at the client to achieve a single unified namespace view across a collection of exported file systems (fsids) at a server. New methods would increase the transparency of the namespace by eliminating client side artifacts such as UNIX mounts for each fsid. Clients utilizing these techniques can operate without the need for peripheral technologies such as autofs, they can lower overall administration costs, and they can be more adaptable to changes in the data environment such as new data creation or movement of data from one server to another.

Therefore, it would advantageous to have a mechanism that allows a user to transparently navigate through multiple exported file system boundaries using a single client side network mount.

SUMMARY OF THE INVENTION

The present invention provides a method, system, and computer program instructions for eliminating troublesome network mounts normally required of administrative users by providing a global name space. With the present invention, users are able to transparently navigate through entire exported file system spaces on a server without having to perform these extra mounts. The present invention provides an advantage over existing systems by allowing a user, by performing a single mount, to view everything that a server has exported. The user does not see multiple mount points on the client, nor does the user see multiple mount entries in the mount table.

When exported file system representing the root (top) of the server exported filesystem space is mounted (root mount) onto a client, the client creates a file system ID structure for the exported file system, wherein the file system ID structure is populated with unique properties of the exported file system, and wherein the unique properties include a file system ID (fsid). The client also creates an internal virtual file system structure for the exported file system ID structure, wherein the internal virtual file system structure includes a virtual file system ID. Once the file system and virtual file system structures are created, the client associates all encountered file system objects within the fsid of the root mount to the created file system ID structure until a new file system ID is encountered.

A new file system ID is encountered when a user on the client has moved from one exported file system to a second exported file system. In response, the client creates a second exported file system ID structure for the second exported file system, wherein the second file system ID structure is populated with unique properties of the second exported file system, and wherein the unique properties includes a second file system ID. The client also creates an internal virtual file system structure for the second exported file system ID structure. Once the new file system and new virtual file system structures are created, the client links the encountered file system objects contained within the new encountered file system to the new file system ID structure until another new file system ID is encountered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
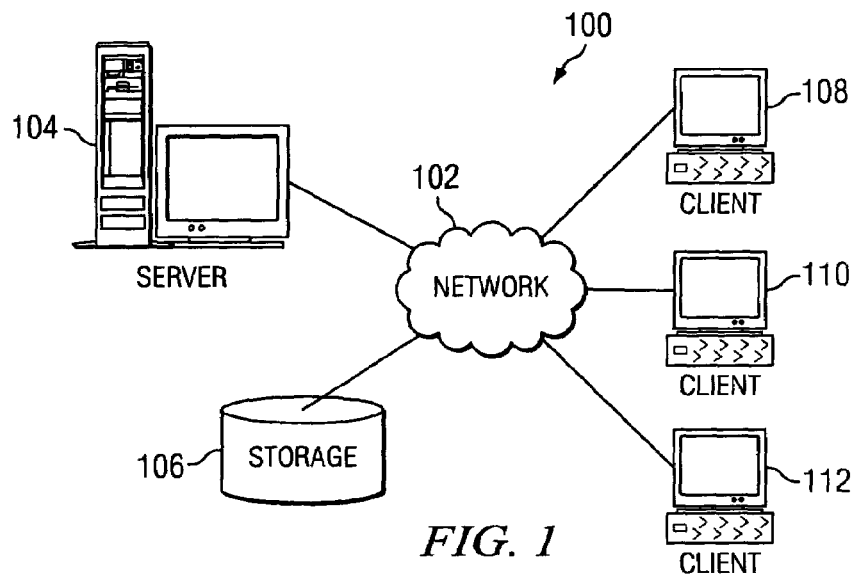
FIG. 1 depicts a representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. These files are stored by the server in a filesystem. The clients also store files in a filesystem. These file systems may include, for example, a Windows NT™ filesystem (NTFS), a Windows™ based filesystem such as FAT32, an AIX file system, a UNIX file system such as System V Release 4 (SVR4), and a Linux file system.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
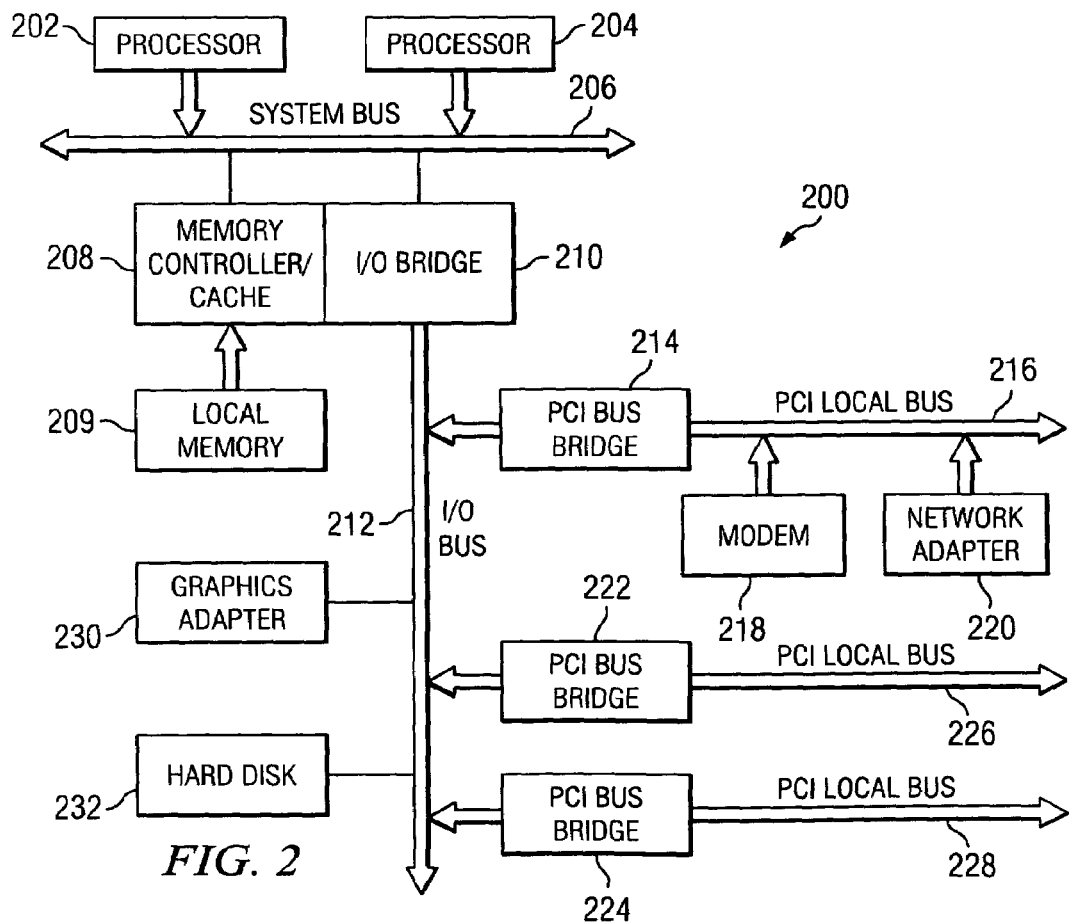
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
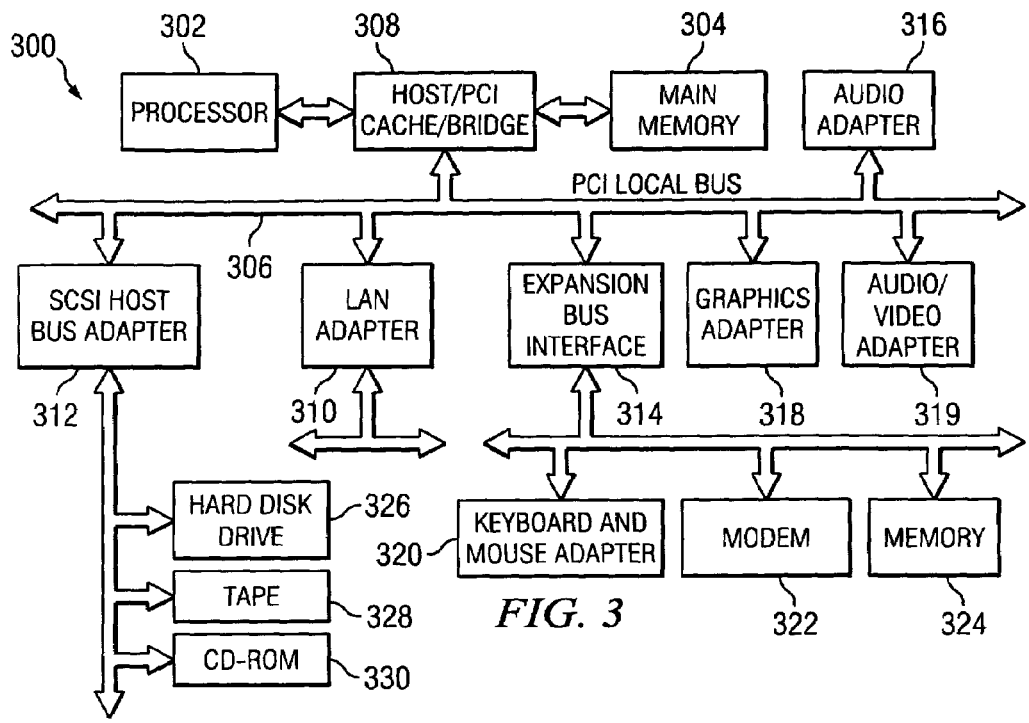
FIG. 3 is a block diagram illustrating a data processing system in which a preferred embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, existing NFS installations require that a mount be performed for each file system from which the user wants to access information. The mechanism of the present invention overcomes this problem by eliminating network mounts normally required of administrative users on a client machine. In particular, the present invention provides a mechanism for navigating through multiple exported file systems using a single network mount. The mechanism of the present invention also allows a user to seamlessly traverse these multiple file systems transparently, such that the user sees a single file tree namespace under one network mount. Other mounts performed by the client that allow the user to access data in other exported file systems are not required. In this manner, the mechanism of the present invention provides key steps toward scalable transparent file sharing with global namespace characteristics.

With the present invention, each time a server exports a file system for use by a requesting client, the client internally constructs a file system ID (fsid) structure for the exported file system. The fsid structure includes an fsid, which is a unique identifier associated with each file system exported by the server. There is a one-to-one relationship between each fsid and file system, such that one fsid uniquely identifies and represents one exported file system. In UNIX operating systems, an fsid typically comprises a pair of major and minor device numbers from a physical device on the server. For example, an fsid may be a 64 bit integer, where the top 32 bits comprise the major number of the resource, and the bottom 32 bits comprise the minor number of the resource.

The fsid may be used by the client to distinguish one exported file system from another. For instance, the client may use the fsid to determine if a user moves from one exported file system on the server to another, and based on this determination, the client may apply the specific settings for the current file system to the user. For example, access rights are used to identify if a requesting user may access particular file systems on the server. A user may have rights to a parent file system but not a child file system. When the user moves from the parent file system to the child file system, the client may deny the user's action by checking the access rights applied to that exported file system. Thus, on the server side, each fsid represents one exported file system. The server provides the fsid to the client to inform the client which exported file is currently in use.

On the client side, a virtual file system ID (vfsid) is used to represent a virtual file system (vfs). Each fsid structure on the client has a private virtual file system which is invisible to other parts of the system. A virtual file system allows all files on all of the devices on the server to appear to exist on one global device. Each virtual file system contains an ID (vfsid) given by the system, the vfsid being a unique number on the client side that is used to uniquely identify each vfs on the client machine. While fsid is used to identify a file system on the server, the client uses the unique vfsid to identify each fsid on the client.

Once the client has constructed the fsid structure, the client then populates the structure with other unique properties of the exported file system, such as a vfsid, server name or IP address, absolute pathname of the exported file system on the server, and the parent of the file system's root object. Unique file system properties are supported on a per fsid basis on the client. Each file and directory tracked by the client in the networked file system has an association to the fsid that corresponds to the exported file system on the server. All file system properties will apply to all of the file and directories within that NFS fsid.

An inode is an internal structure that represents a base object, such as a file, in a file system. A file system comprises a collection of inodes with one particular inode known as the root. An inode may include file size and update information, as well as the addresses of data blocks, or in the case of large files, indirect blocks that, in turn, point to data blocks. One inode is required for each file. Inodes are accessed by starting at the root and looking up a file name to get to another inode. A local UNIX device identifier and inode number may be used to identify a mounted directory within the exported file system.

A vnode is similar to an inode, but rather than being an internal structure that describes a base object such as a file, a vnode is an abstraction of the inode within the UNIX virtual file system (vfs) model internal structure used by a vfs for describing a virtual base object. The vfs will have a vfsid assigned to it, which may also be referred to as a vfs number. A vfsid and vnode number uniquely describe an object (directory, file, etc.) within the mounted file system. The system may obtain the unique vfsid when needed. In the case of an NFS client tracking different server exported filesystems (NFS fsids), the use of vfsids for each encountered fsid is important for proper behavior with applications on the client.

For example, a server exports file systems "/tmp" and "/tmp/a". Without the use of vfsids for each encountered server file system, if the client mounts the root node "/" from the server to "/mnt" and performs a pwd function while in "/mnt/tmp/a" to display the current working directory, it returns "/" instead of "/mnt/tmp/a". Likewise, a UNIX libc getwd function, which gets the current directory pathname, will also return incorrect information "/" because getwd determines when the root node is reached by checking the unique vfsid and inode number of the node. Since "/tmp" and "/tmp/a" have the same inode number, without a unique vfs number (vfsid), getwd will think it has reached the root node sooner than expected. However, with unique vfsids, pwd and getwd will detect transitions between the fsid boundaries and their contained set of vnodes in order to function properly.

With the present invention, all file system objects created within a mount point will either directly or indirectly link back to the initial fsid structure until an fsid transition is encountered. For example, as mentioned above, a major and minor device number pair specified in the fsid structure for a file system may be used as a unique identifier for each exported file system on the server. When a user on the client navigates from one exported file system to another, the client detects that the user has crossed into a new file system on the server by noticing a change in major and minor device numbers. In response, the client constructs a new fsid structure to represent the new exported file system and populates the structure with unique properties of that newly exported file system, including a new fsid. Once the fsid structure is built, other accessed file system objects within the new server file system are linked back to the new fsid structure until another fsid transition is encountered.

In addition, each new fsid structure inherits all the user tunable properties from the parent by default. For example, if the initial mount was performed as a read-only mount, then all of the fsid structures created under that initial mount will be read-only as well. However, a utility may be provided to allow the system administrator to change those user tunable properties on a per fsid structure basis using path names to objects within the fsid. In this manner, a parent fsid structure may be read-only while the child fsid structure is read-write enabled. This utility provides flexibility to the system administrator to selectively control all fsid structures associated with the mount.

As the present invention provides access to all of the file systems under a single mount, and as each virtual file system within the mount is invisible to other parts of the system, file system-wide data may be retrieved for every fsid by performing operations on an individual file system object, such as a file, directory, or the like. Since other parts of the system cannot see the invisible vfs, the only way to retrieve file system-wide data is to rely on the vnode itself.

On the client, once the system administrator performs the initial network mount against the server, users on the client can roam around the exported file systems from the server without performing any extra mounts and still be bound by the settings provided by the system administrator for each individual fsid (exported file system).

Figure 4:
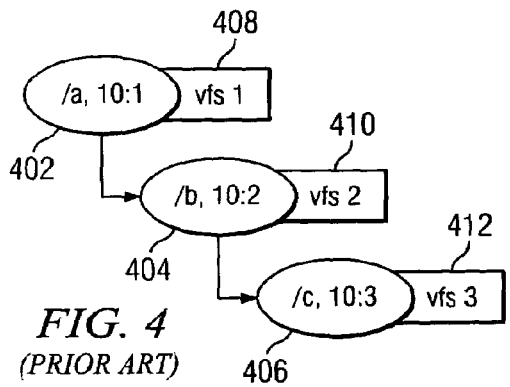
FIG. 4 is a block diagram illustrating a known file system export on the server-side.

FIG. 4 is a block diagram illustrating a known file system export on the server-side. The file system export shown in FIG. 4 is implemented on a server, such as server 104 in FIG. 1. As mentioned previously, a server exports file systems to a client, such as client 108, 110, or 112 in FIG. 1, in response to a request to access information in one or more file systems on a server.

For example, a client wants to access various data from the server, and this data is located in multiple independent file systems, such as file system "/a", file system "/a/b", and file system "/a/b/c". As illustrated, file system "/a" 402, file system "/a/b" 404, and file system "/a/b/c" 406 on the server are independent file systems. File system "/a" 402 is the parent of file system "/a/b" 404, and file system "/a/b" 404 is the parent of file system "/a/b/c" 406. Each exported file system on the server is uniquely identified by a pair of major and minor device numbers. For example, file system "/a" 402 is shown to have a major device number of 10 and a minor device number of 1. Likewise, file system "/a/b" 404 is shown to have major/minor device numbers of 10:2 and file system "/a/b/c" 406 is shown to have major/minor devices numbers of 10:3.

In addition, each file system export has an associated virtual file system that is transparent to other parts of the system. A virtual file system allows all files on the file system to appear to exist on one global device. The system provides each vfs with a unique identifier (vfsid) so that a vfs and file system pair may be identified. For example, "vfs 1" 408 is shown to be associated with file system "/a" 402. Likewise, "vfs 2" 410 and "vfs 3" 412 is associated with file system "/a/b" 404 and file system, "/a/b/c" 406, respectively.

Figure 5:
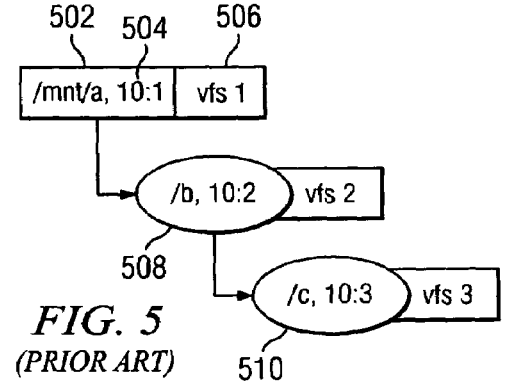
FIG. 5 is a block diagram illustrating a known file system mount on the client-side.

Once a server has exported a file system to the client, the client creates a connection to the server to allow the user to access information in the file system. To establish the connection, the client may mount the exported file system using an NFS protocol. Data in the file system is then available to the client user. For example, FIG. 5 is a block diagram illustrating a known file system mount on the client-side. FIG. 5 illustrates what client's namespace looks like prior to implementing the present invention. The file system mount shown in FIG. 5 may be implemented in a client, such as client 108, 110, or 112 in FIG. 1.

In particular, FIG. 5 depicts the three exported file systems shown in FIG. 4, "/a" 402, "/a/b" 404, and "/a/b/c" 406, as viewed by the client. As shown in FIG. 5, in existing systems, a client must separately mount each exported file system in order to be able to access information in each separate file system on the server. File system "/a" is shown to have been mounted by the client to form client side mount point "/mnt/a" 502, wherein "/mnt" is the starting mount point. Like exported file system "/a" 402 in FIG. 4, "/mnt/a" 502 is shown to have major/minor device numbers of 10:1 504 and is associated with virtual file system "vfs 1" 506.

However, the client cannot access the data in the "/a/b" 508 and "/a/b/c" 510 file systems, as these file systems do not have mount points. Thus, in existing systems, a client must perform two additional mounts (one for each file system to be accessed) in order to establish a connection via NFS for exported file system "/a/b" 508, and to establish a connection via NFS for exported file system "/a/b/c" 510. Once the additional and necessary mounts are performed, the mount table on the client will show three entries, including mount point "/mnt/a", "mnt/a/b", and "mnt/a/b/c".

Figure 6:
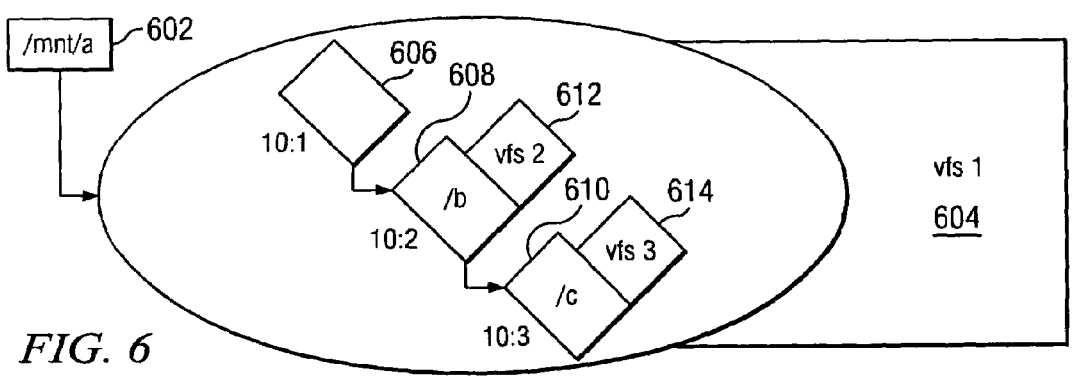
FIG. 6 is an exemplary block diagram illustrating a single network mount used to provide seamless remote traversal in accordance with a preferred embodiment of the present invention.

In contrast, the mechanism of the present invention eliminates troublesome network mounts normally required of administrative users, as well as allows users, who do not have sufficient rights to perform mounts, to access data in exported file systems through a single network mount. FIG. 6 is an exemplary block diagram illustrating a single network mount used to provide seamless remote traversal in accordance with a preferred embodiment of the present invention. FIG. 6 illustrates what a client's namespace may look like once the mechanism of the present invention has been implemented. With seamless remote traversal, the client will only see one mount, although the client is allowed to navigate through the exported file systems as though each exported file system has its own mount point.

In this illustrative example, the system administrator on the client mounts file system "/a" from the server onto "/mnt/a" on the client in 602. As shown, public virtual file system "vfs 1" 604 is associated with "/mnt/a" 602 on the client. Within "vfs 1" 604, the client's namespace may be represented in the following manner. For exported file system "/a" on the server, there is a corresponding fsid structure 606 created in the client with 10:1 as its fsid and "." as its location. For the "/a/b" exported file system on the server, fsid structure 608 is created with 10:2 as its fsid and "/b" as its location. For "/a/b/c" exported file system on the server, the fsid structure 610 is created with 10:3 as its fsid and "/c" as its location. Each fsid structure in FIG. 6 has a private vfs attached to it. For example, fsid structure 606 is associated with "vfs 1" 604, and fsid structure 608 is associated with "vfs 2" 612, and fsid structure is associated with "vfs 3" 614. As a result, there is one private vfs for each fsid structure, and there is one fsid structure per fsid. However, there is only one mount ("/mnt/a" 602) and one public vfs ("vfs 1" 604) on the client.

Figure 7:
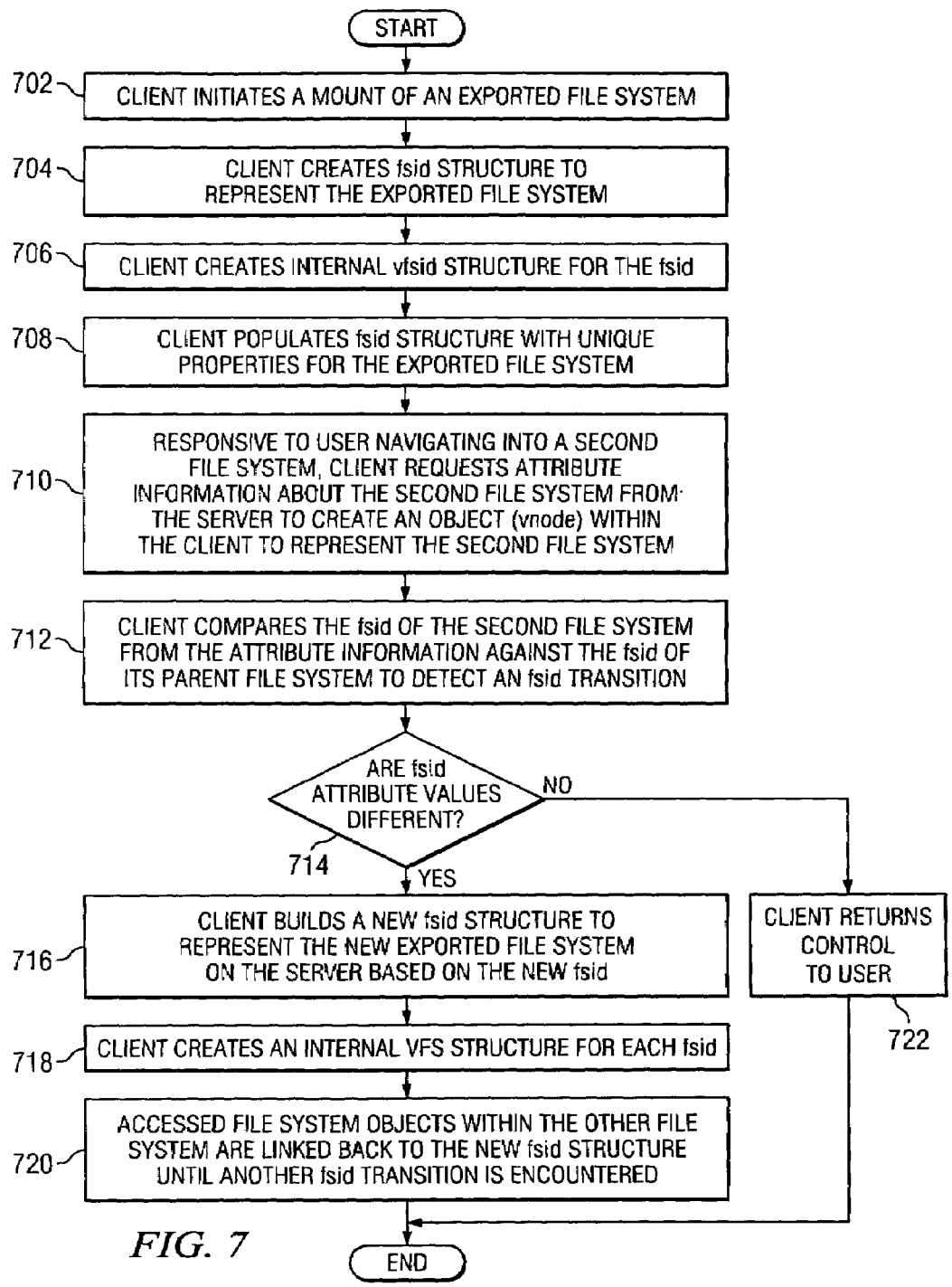
FIG. 7 is a flowchart of a process for transparently navigating through the entire exported file system spaces on a server without having to perform additional mounts in accordance with a preferred embodiment of the present invention.

With reference now to FIG. 7, a flowchart of a process for allowing a user to transparently navigate through the entire exported file system spaces on a server without having to perform additional mounts in accordance with the preferred embodiment of the present invention. The process described in FIG. 7 may be implemented in a server, such as server 104 in FIG. 1 and data processing system 200 in FIG. 2, and in a client, such as clients 108, 110, and 112 in FIG. 1 and data processing system 300 in FIG. 3. Server 104 and 200 should support NFSv4 implementation and also support fileid and mounted_on_fileid attributes within the NFSv4 specification in order to implement the seamless remote traversal process.

For instance, fileid and mounted_on_fileid are used by the client to resolve a readdir system call request. A fileid is a unique identifier in the NFSv4 protocol that represents an object within a file system on the server. In UNIX systems, fileid is basically an inode number. A mounted_on_fileid is a fileid of the object of the same pathname on the server, but covered by the mount or belonging to the parent file system. For example, on many UNIX file systems, the root vnode typically has an inode number of 2. So file systems "/a", "/a/b", and "/a/b/c" all have an inode number of 2 within their file systems, and each fileid for "/a", "/a/b", and "/a/b/c" is 2. The fileid of "/a/b" will be the fileid of the vnode representing "/a/b" in file system "/a/b". However, the mounted_on_fileid for "/a", "/a/b", and "/a/b/c" will not be 2. For "/a/b" the mounted_on_fileid will be the fileid of the vnode representing "/a/b" in file system "/a", rather than filesystem "/a/b". Thus, when a client performs a readdir of file system "/a", server must return the mounted_on_fileid, since if it returns just fileid in the readdir entries, there will have two objects with the same fileid, which violates the definition of fileid.

The seamless remote traversal process begins by mounting an exported file system (step 702). The mounting of an exported file system is the equivalent of making the file system visible or usable by the client. An unmounted file system is considered to be offline in these examples. On the initial mount, the client requests information from the server in order to create an fsid structure to represent the exported file system unit that the client is mounting against the server (step 704). The client also creates an internal vfs structure for each fsid (step 706). For example, "/mnt/a" represents a first fsid structure. The gathered information is placed in the created fsid structure, which includes an fsid, a vfsid, server name or IP address, absolute pathname of the exported file system on the server, and the parent of the file system's root object (step 708). The vfs structure includes a vfsid and object inode values for the vfs. All the file system objects created within the mount either directly or indirectly link back to the fsid structure until a new fsid is encountered.

When a user or application navigates from one file system to another, for example, from "/mnt/a" to exported file system "/a/b", the client looks up file path "/a/b" on the server and requests all of the information about "/a/b" from the server in order to create an object (vnode) within the client to represent file system "/a/b" (step 710). A key piece of requested information is the fsid attribute. When client receives the information, it compares the fsid of "/a/b" against its file system parent "/a" to detect an fsid transition (step 712). For example, the client may detect a change in the major/minor device pair when going from one file system to another, even though the user does not know that the user has navigated to another file system. All the user knows is that the user has navigated into another directory. When a user navigates into a different directory or lookups a file system object, the client will obtain all of the information about the new file system (e.g., "/a/b").

In this example, the parent of the fsid of "/a/b" is the fsid of "/a". If the fsid attribute values are different (step 714), then an exported file system boundary has been crossed. If the client does not detect such a transition in step 714 (i.e., no change in fsid), then the user has not crossed over an fsid boundary. In this case, the client will return control to the user (step 722).

Turning back to step 714, if the client detects an fsid transition, the client builds a new fsid structure to represent the new exported file system on the server based on the new fsid (step 716). The client also creates an internal vfs structure for the new fsid (step 718). Once the fsid structure is built, other accessed file system objects within the other file system (e.g., "/mnt/a/b") are linked back to the new fsid structure until another fsid transition is encountered (step 720). In this manner, if another fsid transition is encountered, a new fsid will be constructed and everything within that fsid will be linked to that new fsid.

It should also be noted that not only does the client need to know how to go from fsid to fsid going down the file system tree, the client needs to know how to go up the file system tree as well. The client should record enough information within the fsid structure to allow the client to navigate back to the parent directory containing the fsid when the client is at the root of an fsid. For example, if user is in "/mnt/a/b", the user should be able to perform a change directory command such as "cd . .". To facilitate this ability, every fsid structure may be allowed to have a reference to its parent. This can vary on implementation. It might be done as a data structure reference to the parent's vnode or it may be saved as a pathname to the parent. Therefore, whenever ". ." is requested, client may just follow the link presented.

Thus, the present invention provides a method, system, and computer program instructions for allowing a user to transparently navigate through multiple exported file systems using a single network mount. The advantages of the present invention should be apparent in view of the detailed description provided above. A user may create an autofs mounted file system that allows a user to traverse between exported file systems without the need for additional mounts using existing systems. However, such methods do not include allowing a user to seamlessly traverse multiple exported file systems transparently and they involve administration outside the normal NFS server administration. With the present invention, a user may not only navigate through exported file systems, but the user may do so transparently, wherein the user only sees a single network mount. In this manner, users that do not have sufficient rights, on the client, to perform mounts and establish connections between machines may still gain access to these remote file systems and let the server decide whether the user have sufficient rights to navigate through the exported file system. In addition, no administration is required beyond the normal NFS server administration to export file systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for seamlessly traversing multiple exported file systems transparently using a single network mount, comprising:

mounting a first exported file system onto a client;

creating a first file system identifier structure for the first exported file system to form a first exported file system identifier structure, wherein the first file system identifier structure is populated with unique properties of the first exported file system, and wherein the unique properties include a file system identifier;

recording parent information in the first exported file system identifier structure, wherein recording the parent information allows the client to service a request to traverse a file namespace backwards to a root of the single network mount, and wherein the recorded parent information in the first exported file system identifier structure includes a pathname to a root of the first exported filed system identifier structure;

creating a first internal virtual file system structure for the first exported file system identifier structure, wherein the first internal virtual file system structure includes a first virtual file system identifier, wherein the first virtual file system identifier is used to uniquely describe objects within a mounted file system, and wherein the first virtual file system identifier allows for distinguishing objects in different server file systems encountered on the client;

linking files system object created within the single network mount to the first file system identifier structure until a new file system identifier is encountered;

responsive to a determination that a user on the client has moved from the first exported file system to a second exported file system, creating a second exported file system identifier structure for the second exported file system, wherein the second exported file system identifier structure is populated with unique properties of the second exported file system, wherein the unique properties include a second file system identifier, wherein the second file system identifier structure inherits all user tunable properties from the second file system identifier structure, wherein the user tunable properties include access control information, and wherein the user tunable properties are selectively controlled on a per file system identifier structure bases using pathnames to objects within the second file system identifier;

creating a second internal virtual file system structure for the second exported file system identifier structure, wherein the second internal virtual file system structure includes a second virtual file system identifier;

linking the file system objects created within the mount to the second file system identifier structure until a new file system identifier is encountered;

determining that the user on the client has traversed from the first exported file system into the second exported file system by detecting a change in major device number and minor device number, wherein the user on the client is bound by the settings provided for each individual file system identifier;

retrieving file system wide data for each file system identifier, wherein the file system wide data is retrieved by performing operations on an individual file system object associated with the file system identifier.

* * * * *